United States Patent
Iwamura (10) Patent No.: US 6,440,180 B2
(45) Date of Patent: Aug. 27, 2002

(54) ENCLOSED STORAGE BATTERY AND ITS MANUFACTURING METHOD

(75) Inventor: Akira Iwamura, Toyohashi (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,694

(22) Filed: Apr. 22, 1998

(30) Foreign Application Priority Data

Apr. 22, 1997 (JP) ............................................. 9-104469

(51) Int. Cl.[7] .......................... H01M 2/30; H01M 2/22; H01M 2/06
(52) U.S. Cl. ....................... 29/623.1; 429/178; 429/180
(58) Field of Search ................................ 429/178, 179, 429/180, 181, 184, 183; 29/623.1, 623.2

(56) References Cited

U.S. PATENT DOCUMENTS

| | | | | |
|---|---|---|---|---|
| 4,444,853 A | * | 4/1984 | Halsall et al. | 429/177 |
| 4,898,796 A | * | 2/1990 | Furukawa et al. | 429/178 |
| 5,885,731 A | * | 3/1999 | Shannon et al. | 429/161 |
| 5,905,002 A | * | 5/1999 | Lund et al. | 29/623.1 |

FOREIGN PATENT DOCUMENTS

| | | |
|---|---|---|
| EP | 0 402 635 | 12/1990 |
| GB | 1 582 592 | 1/1981 |
| GB | 2 169 130 | 7/1986 |
| JP | 56-136457 | 10/1981 |
| JP | 58-223254 | 12/1983 |
| JP | 60-117547 | 6/1985 |
| JP | 61-198552 | 9/1986 |
| JP | 2-234347 | 9/1990 |
| JP | 4-206459 | 7/1992 |

OTHER PUBLICATIONS

European Search Report for Int'l Appln No. 98106259 dated Aug. 18, 1998, published in EP878856 A1, Nov. 18, 1998.

* cited by examiner

Primary Examiner—Stephen Kalafut
Assistant Examiner—Jonathan Crepeau
(74) Attorney, Agent, or Firm—RatnerPrestia (57) ABSTRACT

An enclosed storage battery having an excellent closed tightness and reliability is obtained. An annular bump is formed integrally with the upper periphery of the penetration hole of a lead-alloy bushing buried in the top of the lid for covering the jar. The leading end of the pole passing through the penetration hole of the bushing is inserted into the lower part of the annular bump. A recess is formed on the, top of the leading end of the pole so as to be easier to melt the upper portion of the pole, and by welding with the inner wall of the penetration hole of the bushing, the annular bump is later melted, and the bushing penetration hole is filled up with the fused lead.

2 Claims, 9 Drawing Sheets

ENCLOSED STORAGE BATTERY AND ITS MANUFACTURING METHOD

FIELD OF THE INVENTION

The present invention relates to an enclosed storage battery, and more particular to the bushing structure of the terminal unit of the storage battery.

BACKGROUND OF THE INVENTION

In the enclosed storage battery, the input and output terminals have welded portions of poles penetrating from inside of the jar to the outside. It is important that the areas between the poles and penetration holes in the peripheral areas of poles be kept air-tight and closed.

Figure 10:
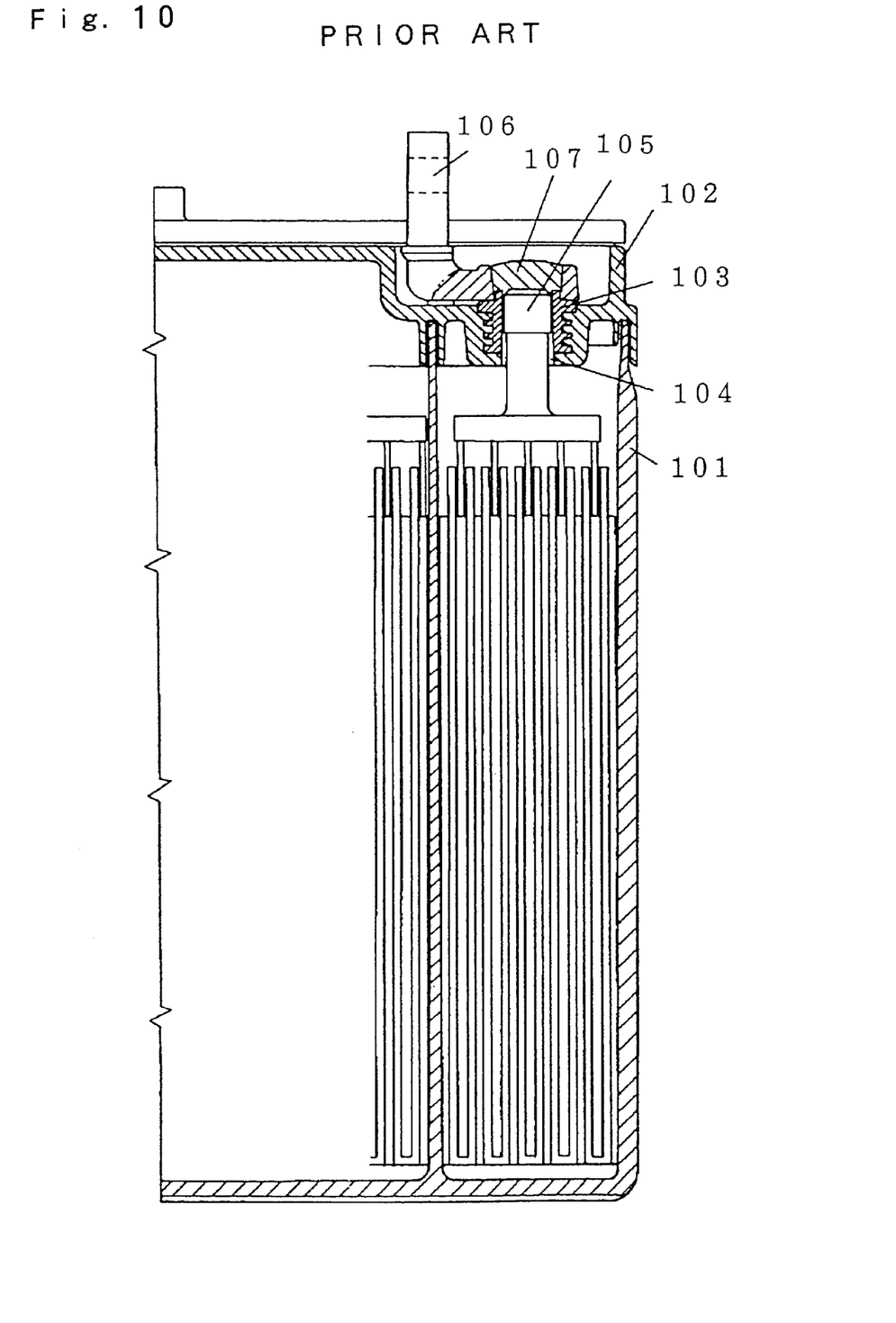
FIG. 10 is a sectional view of a terminal unit of a conventional enclosed storage battery.

A bushing structure of terminal unit of a conventional enclosed storage battery is shown in FIG. 10. In FIG. 10, a lid 102 is placed to cover the opening of a jar 101. A lead-alloy bushing 103 is buried in the lid 102. A pole 105 is inserted into a penetration hole 104 formed in the bushing, and this pole 105 is integrally welded to an L-shaped input and output terminal 106 placed on the top of the bushing 103. The leading end of the pole 105 penetrating through the penetration hole 104 of the bushing 103 is welded to the upper periphery of the bushing 103, and is further welded and integrated while filling a cavity 107 of the L-shaped input and output terminal 106 with fused lead.

On the other hand, as a modified example of terminal of a conventional enclosed storage battery, the following constitution is known (not shown). That is, the bushing 103 is not formed integrally to the lid 102 at the lower end of the penetration hole 104, but generally the lower end of the bushing 103 is projecting from the inner side of the lid 102 to the inner side direction of the penetration hole 104. Accordingly, when inserting the pole 105 into the penetration hole 104 from the inner side of the jar 101, the leading end of the pole 105 hits against the lower end of the bushing 103, and the pole 105 cannot be smoothly inserted into the penetration hole 104.

In such connection method of bushing 103 and pole 105, since the upper part of the bushing 103 and the top of the pole 105 are on a same plane, and only the leading end periphery of the pole 105 is welded to the bushing 103, the welding region is small, and the strength at the junction was insufficient.

Moreover, the alloy in the weld zone is a non-uniform mixed alloy, and corrosion initiates from the grain boundary, and, as a result, the electrolyte oozes out. Besides, since the mixed alloy of the weld zone is similar to the material of the pole, and it is soft and insufficient in strength.

To compensate for shortage in strength, it is proposed to reinforce by placing the L-shaped input and output terminal 106 on the bushing 103, and filling the cavity 107 formed in the input and output terminal 106 with a fused lead by melting an additional lead. This additional lead is made of same alloy material as the lead alloy for composing the terminal, and hence the material strength is sufficiently assured, but such manufacturing process of storage battery is may be complicated and may require many steps.

SUMMARY OF THE INVENTION

The enclosed storage battery of the invention comprises:
(a) a jar having an opening,
(b) plate group and electrolyte placed in the jar,
(c) a lid placed in the opening having (1) a conductive bushing having a penetration hole penetrating from inside to outside of the jar, being formed of a first fusible material, and
(2) a conductive terminal electrically connected to the bushing, (d) a conductive pole electrically connected to the plate group, inserted and set in the penetration hole, and formed of a second fusible material, and
(e) at least one fused matter joining the pole and the bushing selected from
(i) a first fused matter formed by melting the bushing, and
(ii) a second fused matter formed by melting the pole.

The manufacturing method of enclosed storage battery of the invention comprises:
(a) a step of placing a plate group in a jar having an opening,
(b) a step of injecting electrolyte into the jar,
(c) a step of connecting a pole to the plate group,
(d) a step of placing a terminal and a lid having a bushing electrically conducting with the terminal so as to cover the opening,
(e) a step of inserting the pole into a penetration hole formed in the bushing, from inside of the jar, and
(f) a step of integrating the pole and the bushing by at least one step selected from
(1) a step of melting part of the pole, and joining the pole and the bushing by a second fused matter formed by its melting, and
(2) a step of melting the upper part of the penetration hole of the bushing, and joining the pole and the bushing by a first fused matter formed by its melting.

Preferably, the first fusible material of the bushing is formed of at least one material of lead and lead alloy.

Preferably, the second fusible material of the pole is formed of at least one material of lead and lead alloy.

Preferably, the second fused matter formed by melting the leading end of the pole is joining the pole and the bushing.

Preferably, the first fused matter formed by melting the bushing is joining the pole and the bushing.

Preferably, the lid is formed of a material including resin.

Preferably, the peripheral portion of the top of the pole has at least one surface of round surface and curved surface.

Preferably, the lower side of the lid positioned at the lower end of the penetration hole has a taper form.

Preferably, a terminal cover is further placed in the lid so as to cover the bushing.

In this constitution, the adhesion strength of the pole and bushing is extremely enhanced. Further, the tightness is improved.

Moreover, corrosion of the junction of the pole and bushing is prevented, and leak of electrolyte is prevented.

Thus, the enclosed storage battery with an excellent reliability having the above properties is obtained.

In a simple manufacturing process, the enclosed storage battery having an excellent adhesion strength of pole and bushing is manufactured.

REFERENCE NUMERALS

1 Jar
2 Lid
3 Bushing
4 Penetration hole
5 Pole
6 Input and output terminal
7 Additional lead
8 Annular bump
9 Leading end of pole
10 Inner wall
12 Resin
13 Taper
14 Cavity
15 Weld zone
16 Terminal cover
17 Peripheral edge
18 Rib protrusion
19 Plate group
20 Curved surface
41A Male die
41B Die
42 Core side pin
42A Taper of die
43 Cavity
50 Hole

DESCRIPTION OF THE PREFERRED EMBODIMENTS

Referring now to the drawings, preferred embodiments of the invention are described below.

Figure 1:
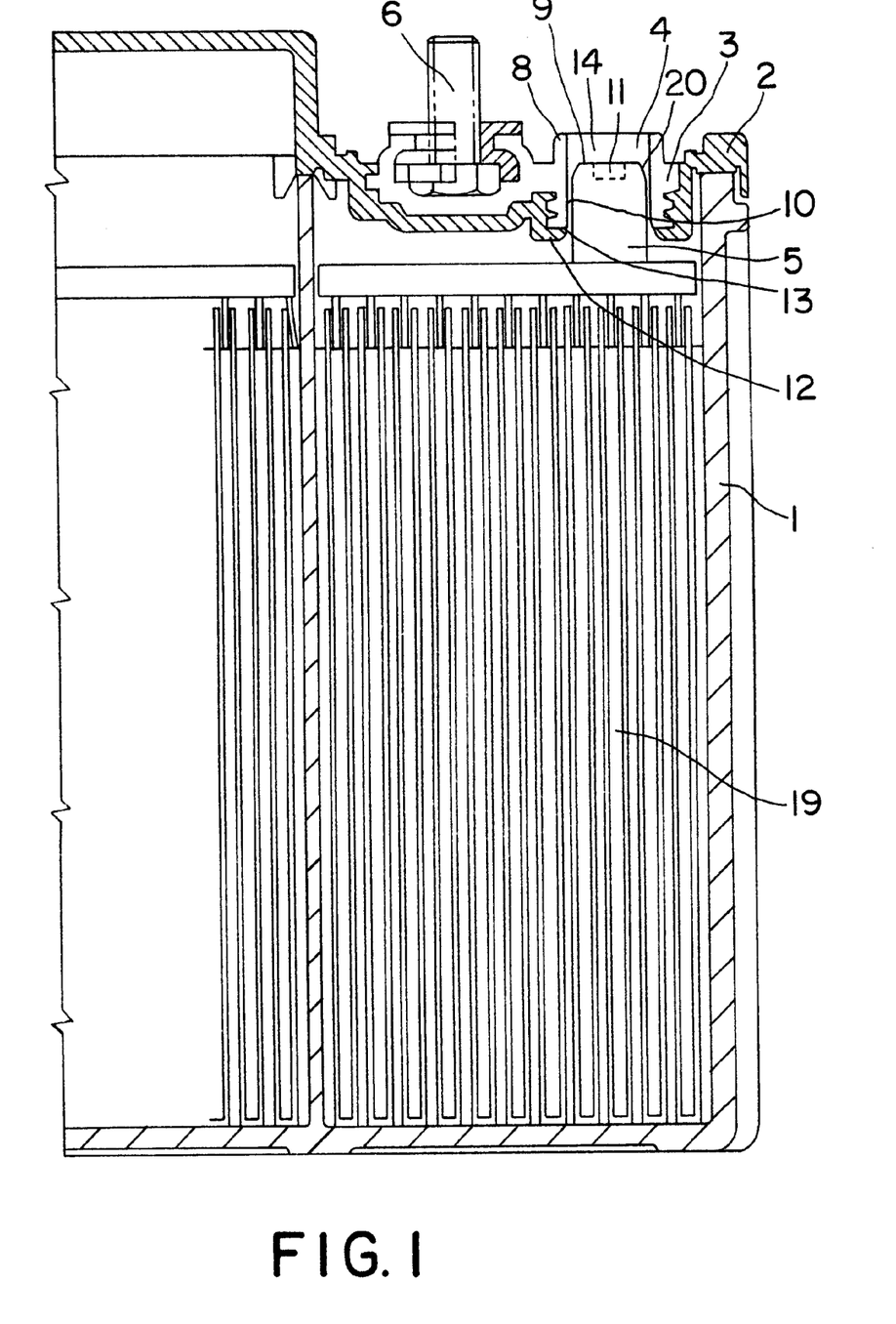
FIG. 1 is a sectional view of an enclosed storage battery in an exemplary embodiment of the invention before welding of the pole.

FIG. 1 is a diagram showing the pole before welding and the terminal cover before welding in the battery in an embodiment. In FIG. 1, the enclosed storage battery comprises a jar 1 having a plate group 19 accommodated in a cell compartment, a lid 2 for covering the opening of the jar 1, and an input and output terminal 6 buried in the upper part of the lid 2. A bushing 3 made of lead alloy material is placed in the lid 2, and a penetration hole 4 is formed to penetrate from inside to outside of the jar. A terminal 6 contacts with the bushing 3, and electrically conducts with the bushing 3. At the upper peripheral edge of the penetration hole 4 of the bushing 3, an annular bump 8 is for med. A pole 5 is inserted into the penetration hole 4 from the inner side of the jar 1, and a leading end 9 of the pole 5 is placed below the annular bump 8.

The pole 5 is formed of a fusible material. The bushing 3 is also formed of a fusible material. As such fusible material, lead or lead alloy is used. The pole 5 and bushing 3 are made of same or different materials. In this state, the leading end 9 of the pole 5 is melted, and a produced second fused matter joins an inner wall 10 of the penetration hole 4 of the bushing 3 and the pole 5. Then, the bump 8 made of lead alloy material is melted. The second fused matter of the melted lead alloy material plugs between the penetration hole 4 of the bushing 3 and the pole 5, and also covers the top of the pole 5 to enclose the penetration hole 4 of the bushing 3 and the pole 5 tightly. Thus, the pole 5 and bushing 3 are integrated. The input and output terminal 6 contacts with the bushing 3 to conduct electrically. The structure after the pole 5 is welded to the bushing 3 is shown in FIG. 2 and FIG. 3.

It is also possible to form a recess 11 on the top of the leading end 9 of the pole 5, and in such constitution, it is easier to melt the recess 11 of the pole 5, so that the inner wall 10 of the penetration hole 4 and the pole 5 can be joined more easily.

Figure 2:
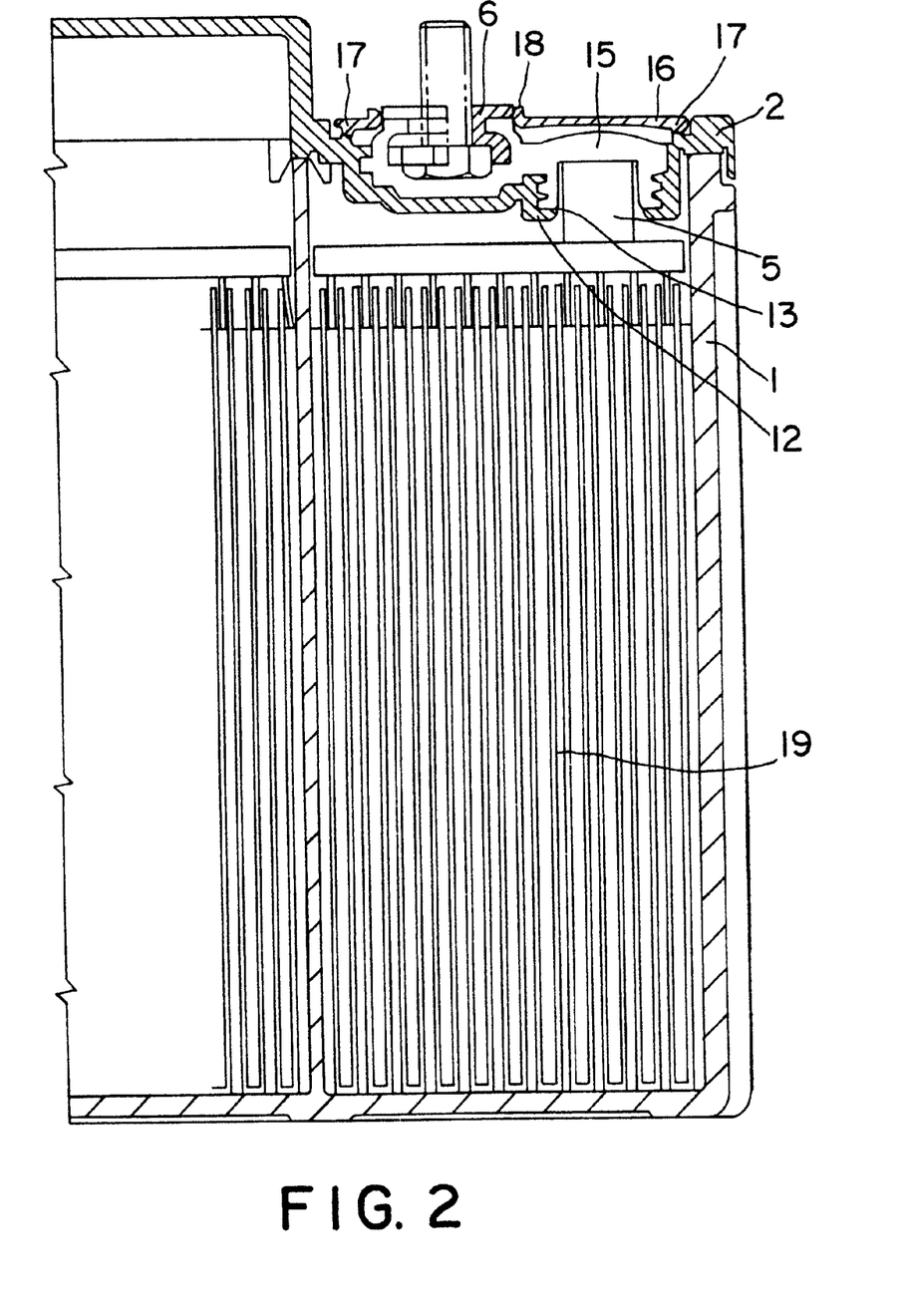
FIG. 2 is a sectional view of an enclosed storage battery in an exemplary embodiment of the invention after welding of the pole.
Figure 3:
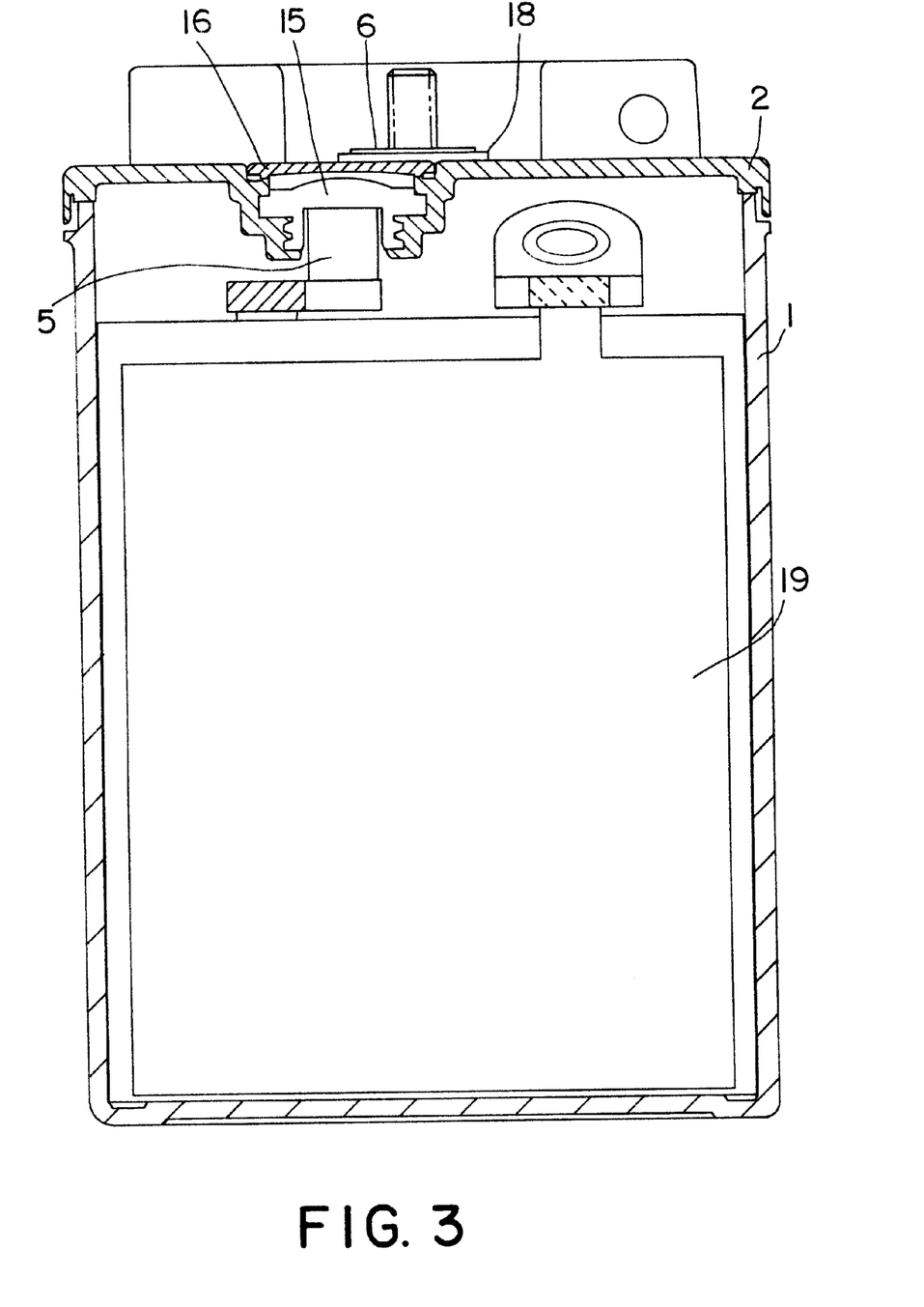
FIG. 3 is a sectional view in a light-angle direction of FIG. 2.

In FIG. 1, FIG. 2 and FIG. 3, the leading end 9 of the pole 5 is positioned in the middle of the penetration hole 4. Then, by a second fused matter produced by melting the leading end 9 of the pole 5, it is joined to the inner wall 10 of the penetration hole 4. For the ease of welding of the leading end 9 of the pole 5 to the inner wall 10, the recess 11 is formed on the top of the leading end of the pole 5, so that the leading end of the pole 5 may be melted easily. The second fused matter such as molten lead of the recess 11 provided in the leading end 9 of the pole 5 joins the inner wall 10 and pole 5 while filling up the gap between the pole 5 and penetration hole 4. At this time, a slight cavity 14 is left over in the upper part of the penetration hole 4. Later, the bump 8 of lead alloy material formed integrally with the upper peripheral edge of the penetration hole 4 of the bushing 3 is melted, and the first molten matter of the fused lead alloy joins the pole 5 and bushing 3, and further it is poured into the cavity 114 enclosed by the inner side of the penetration hole 4 and the upper part of the pole 5, and the cavity 14 is filled up. Further, at this time, the melted first fused matter may also filled up the remaining portion of the recess 11 formed in the pole 5. In this way, a weld zone 15 is formed.

In this constitution, the adhesion strength of the pole 5 and bushing 3 is extremely enhanced. Further, the gap between the pole 5 and bushing 3 is filled up completely with the fused matter such as the first fused matter and second fused matter, so that the opening of the jar 1 is completely closed by the lid 2.

In the embodiment, both constitutions of (1) melting the upper part of the pole 5 to join the pole 5 and bushing 3 by its fused matter, and (2) melting the upper part of the penetration hole of the bushing 3 to join the pole 5 and bushing 3 by its fused matter are shown, but the constitution may be composed of only one of the two. However, in the constitution having either one, as compared with the constitution having both, the closed tightness and junction strength are slightly inferior,but superior closed tightness and junction strength to those of the conventional storage battery can be obtained.

Figure 7:
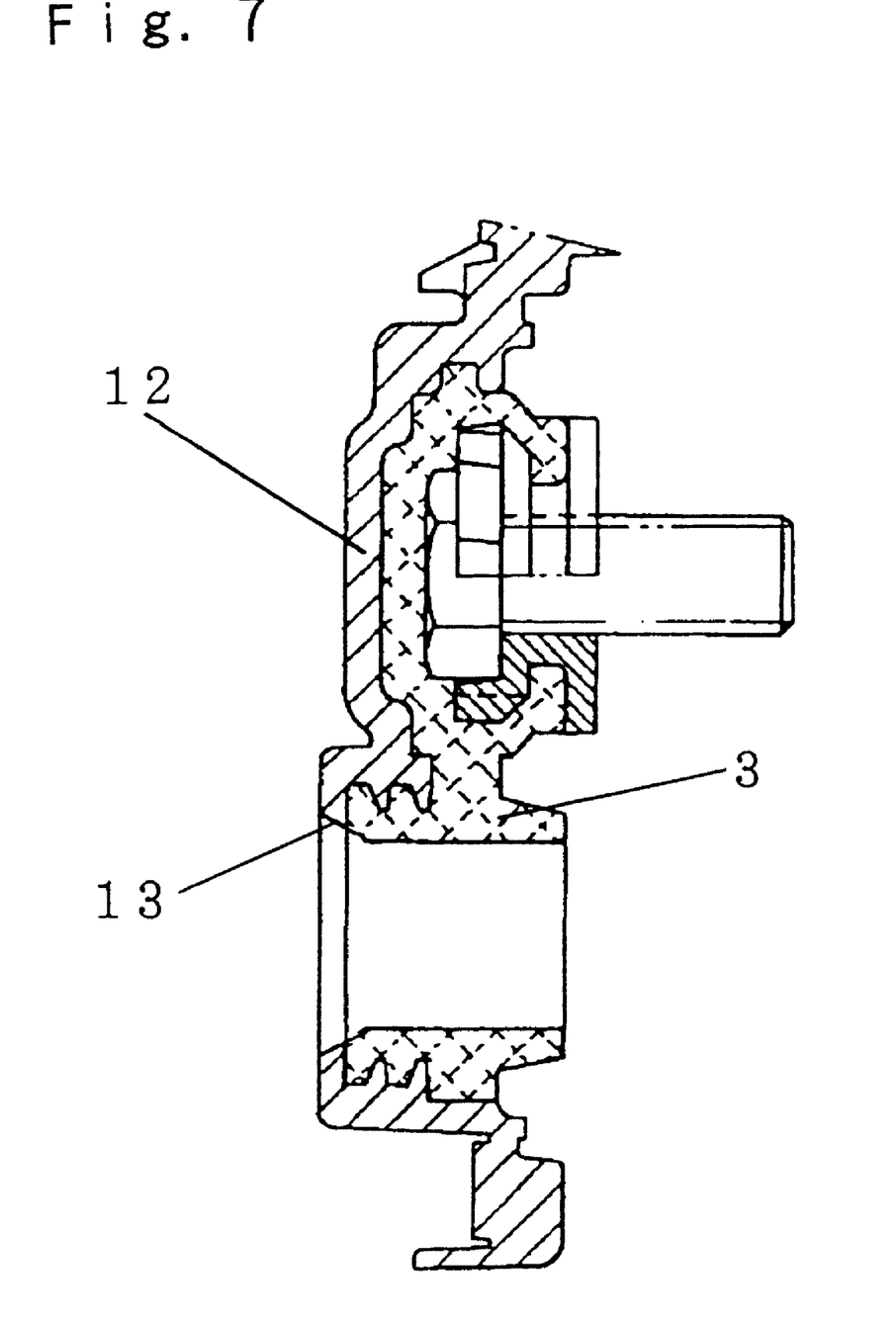
FIG. 7 is a magnified sectional view of a terminal cover disposed in the enclosed storage battery in accordance with an exemplary embodiment of the invention.
Figure 8:
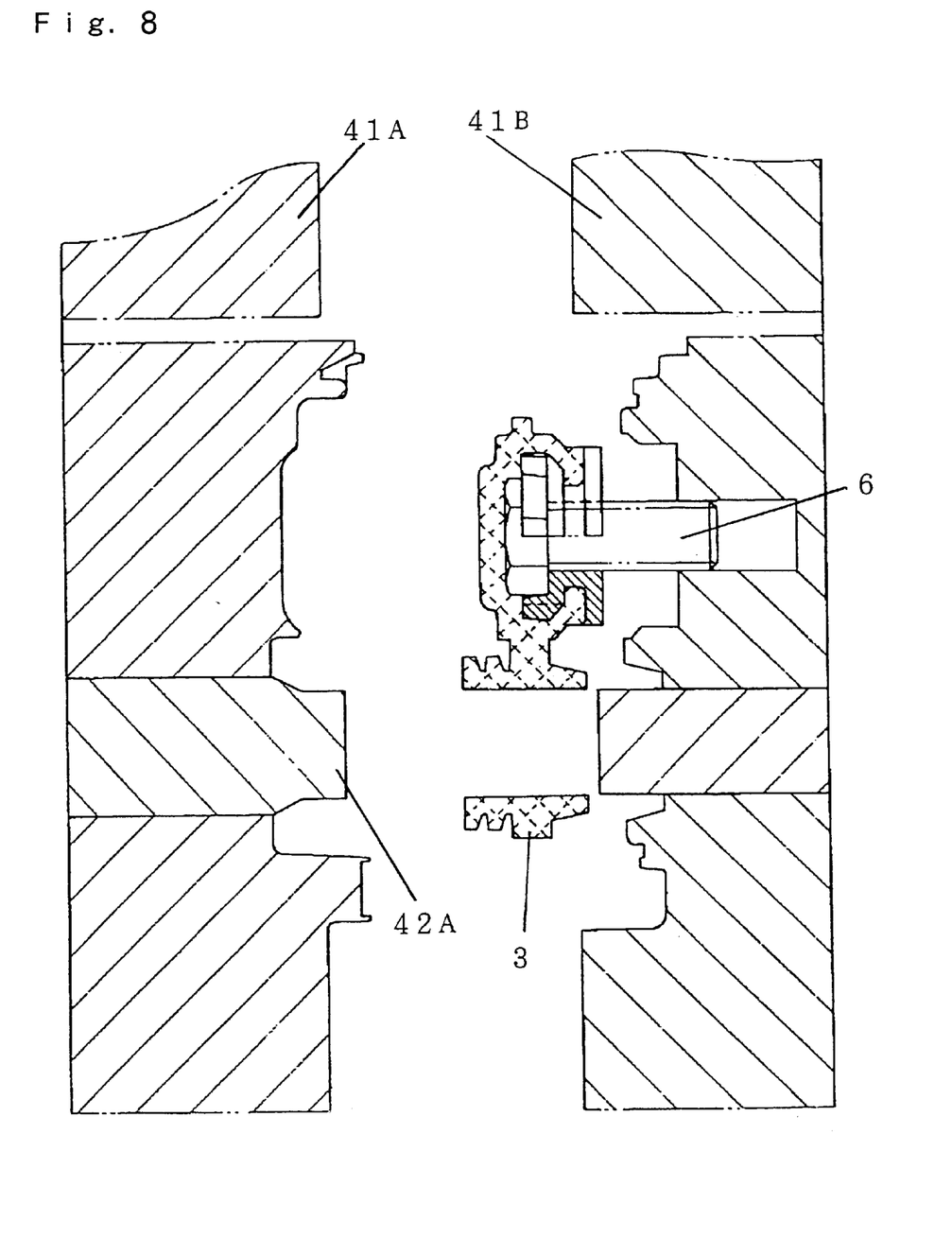
FIG. 8 is a sectional view of a terminal unit disposed in the enclosed storage battery in accordance with an exemplary embodiment of the invention, and a die used in the manufacture thereof.
Figure 9:
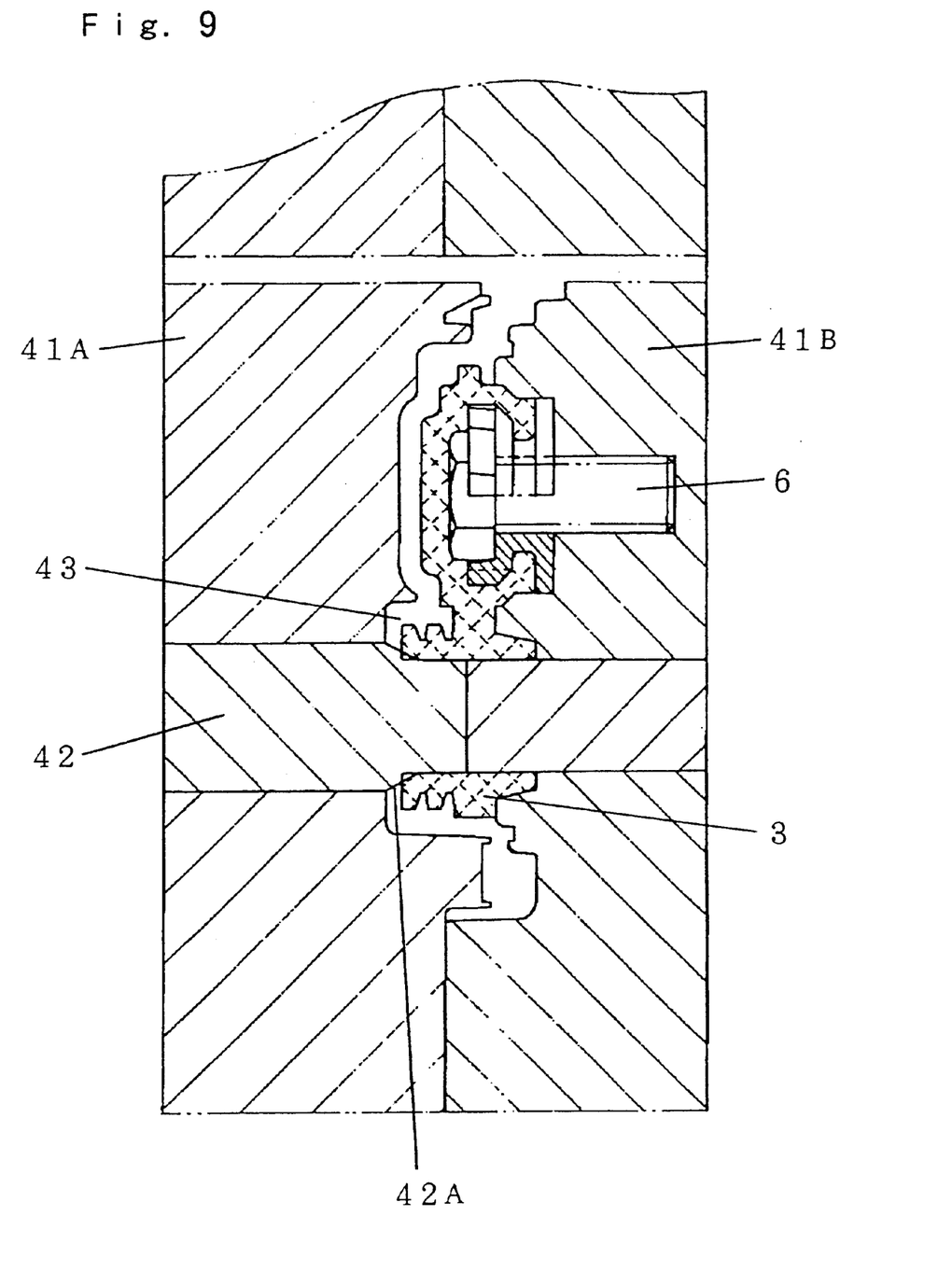
FIG. 9 is a sectional view of the terminal and the die used in the manufacture thereof in FIG. 8.

FIG. 8 shows an example of a die structure for forming the lid of the enclosed storage battery of the invention, in which a male die 41A and a die 41B are open to be ready for installing the bushing 3. FIG. 9 shows the closed state of the die. At the lower end of the penetration hole of the bushing 3, the taper 42A of a core side pin 42 of the male die 41A is interfering. The core side pin 42 of the male die 41A is inserted into the penetration hole 4 of the bushing 3 placed in the die 41B. At this time, the taper 42A of the pin 42 compresses the end portion of the penetration hole 4, and a taper form is shaped in the end portion of the penetration hole 4. When a cavity 43 of the die is filled with resin, the taper 13 formed by this taper 42A functions as the seal. At the same time, the taper 42A of the die also has the function of pressing the bushing 3 to the die 41B side. In this state, the resin material is injected into the cavity 43, and the resin portion 12 is formed. In this way, the lid 2 having a tapered hole continuous to the lower end of the penetration hole 4 is manufactured. A structural diagram of the completed part is shown in FIG. 7. As shown in FIG. 7, the continuous taper 13 from the resin portion 12 of the lid 2 to the penetration hole of the bushing 3 is formed.

The periphery of the leading end of the pole 5 has a round surface or curved surface 20. In such constitution, when inserting the pole 5 into the penetration hole 4 from the inside of the jar 1, it can be smoothly inserted into the penetration hole 4 without being caught on the edge of the penetration hole 4 of the bushing 3.

Figure 4:
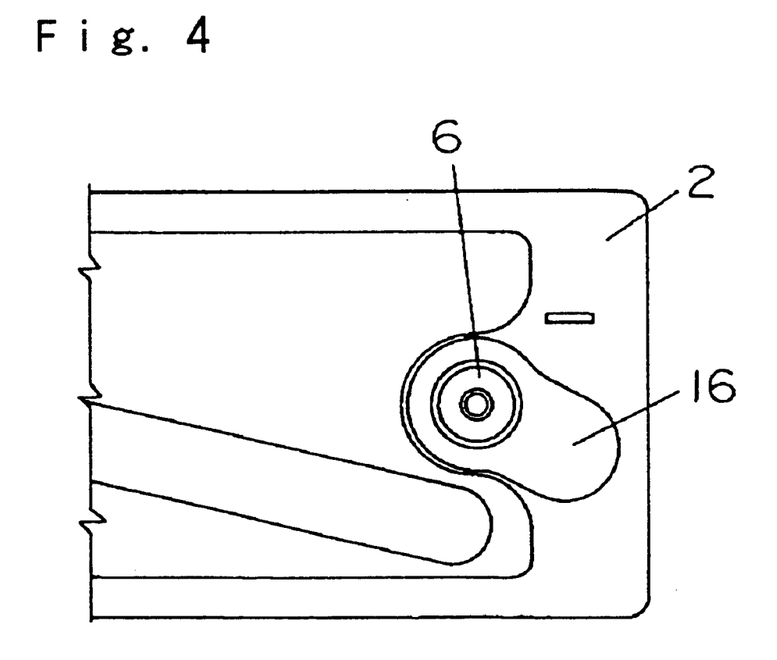
FIG. 4 is a partial plan view of an enclosed storage battery in accordance with an exemplary embodiment of the present invention.
Figure 5:
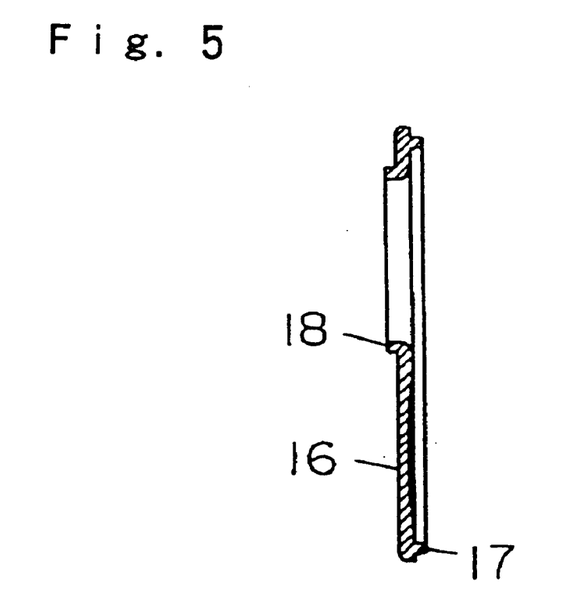
FIG. 5 is a sectional view of a terminal cover disposed in the enclosed storage battery in accordance with an exemplary embodiment of the present invention.
Figure 6:
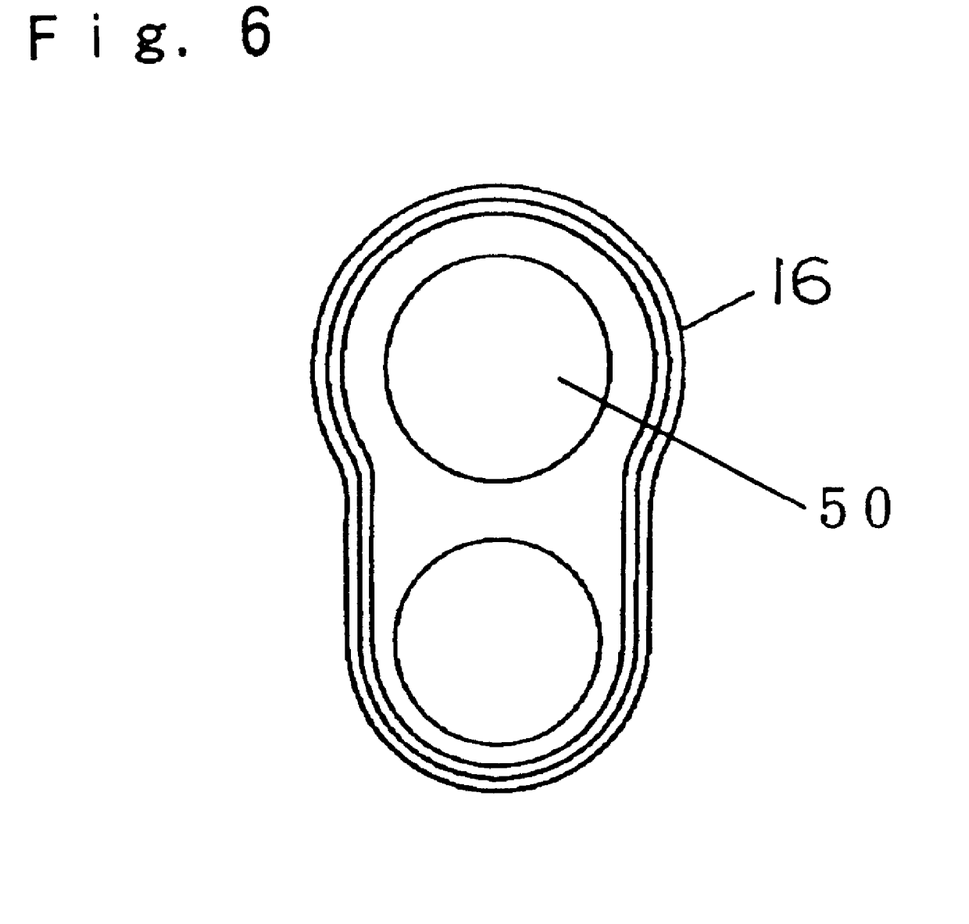
FIG. 6 is a plan view of the back side of the terminal cover shown in FIG. 5.

Drawings showing the terminal cover 16 constituted in the embodiment are shown in FIG. 4 through FIG. 6. In FIG. 2 through FIG. 6, the terminal cover 16 is placed around the terminal 6, covering the weld zone 15 filling up between the pole 5 and penetration hole 4. The terminal cover 16 has a upper peripheral edge 17 and a hole 50. A rib protrusion 18 is formed in the inner circumference of the hole 50. The peripheral edge 17 is hot welded to the lid 2. The protrusion 18 is hot welded to the terminal 6, surrounding the terminal 6.

In this constitution, the closed tightness of the enclosed storage battery is enhanced. Also the adhesion strength of pole and bushing is extremely enhanced. Further, since the lead alloy of the weld zone of the pole and bushing is the same lead alloy as the bushing material, corrosion from the grain boundary of the alloy and exudation of electrolyte do not occur. Still more, the series of process of this manufacturing method is not complicated, and therefore the enclosed storage battery can be manufactured in a small number of steps. Moreover, the lead alloy material composing the annular bump as part of the bushing has an excellent mechanical strength, so that an enclosed storage battery having an excellent mechanical strength may be obtained.

What is claimed is:

1. A manufacturing method of an enclosed storage battery comprising the steps of:
    (a) placing a plate group in a jar having an opening,
    (b) injecting electrolyte into said jar,
    (c) connecting a pole to said plate group, said pole having a leading end, wherein a recess is located on said leading end of said pole,
    (d) placing a terminal and a lid having a bushing electrically conducting with said terminal so as to cover said opening, said bushing having a portion defining a penetration hole with an inner wall,
    (e) inserting said pole from inside of said jar into said penetration hole of said bushing, said inner wall encompassing the conductive pole, positioning the leading end of the pole at a position below the upper periphery of the portion of said bushing defining the penetration hole, and
    (f) integrating said pole and said bushing by the steps of first (1) melting part of said pole, and joining said pole and said bushing by a second fused matter formed by melting a part of said pole, the second fused matter positioned between said hole and the inner wall, and then (2) melting an annular bump located on the upper periphery of said penetration hole of said bushing, and joining said pole and said bushing by a first fused matter formed by melting of said annular bump, said first fused matter formed at the leading end of the pole.

2. The manufacturing method of claim 1, wherein said conductive pole has a further annular bump formed at an end portion thereof, and said step (1) includes a step of joining said pole and said bushing by a second fused matter formed by melting said further annular bump.

* * * * *